April 19, 1966  C. B. VAUGHAN  3,247,445
POLARITY REVERSIBLE RECTIFYING CIRCUIT
Original Filed Jan. 15, 1962  3 Sheets-Sheet 1

INVENTOR.
CARROLL B. VAUGHAN
BY *Hubert L. Davis*
ATTORNEY

April 19, 1966 C. B. VAUGHAN 3,247,445
POLARITY REVERSIBLE RECTIFYING CIRCUIT
Original Filed Jan. 15, 1962 3 Sheets-Sheet 2

INVENTOR.
CARROLL B. VAUGHAN
BY
*Herbert L. Davis*
ATTORNEY

INVENTOR.
CARROLL B. VAUGHAN
BY
ATTORNEY

United States Patent Office 3,247,445
Patented Apr. 19, 1966

3,247,445
POLARITY REVERSIBLE RECTIFYING CIRCUIT
Carroll B. Vaughan, East Orange, N.J., assignor to The Bendix Corporation, a corporation of Delaware
Original application Jan. 15, 1962, Ser. No. 166,224. Divided and this application Aug. 6, 1963, Ser. No. 300,317
3 Claims. (Cl. 321—8)

The present application is a division of U.S. application Serial No. 166,224, filed January 15, 1962 by Carroll B. Vaughan and assigned to The Bendix Corporation, and the invention relates in general to a polarity reversible rectifying circuit and more particularly to a polarity reversible rectifying circuit including novel means for reversing polarity of a direct voltage supplied at a particular channel without the introduction of undesirable switching transients or surging electric currents.

Heretofore, a number of devices were available to supply from a single alternating current source, a plurality of independently adjustable alternating currents on a plurality of channels. These devices used a separate auto transformer for each output channel. Or, if there was a predetermined relationship between the alternating currents to be provided at two channels, a single auto transformer was used, with two brushes mechanically linked together.

There may be provided, however, a multi independent brush auto transformer that provides a plurality of independently adjustable alternating currents on a plurality of channels. In the present invention, a plurality of rectifying circuits are attached one each, to each output channel of the multi independent brush auto transformer to rectify the alternating current output. Several of the rectifying circuits may include a reversing circuit, of a novel design, for reversing polarity of the direct voltage supplied at a particular channel without the introduction of the usual undesirable switching transient electric currents.

An object of the invention is in the provision of a novel polarity reversible rectifying circuit.

Another object of the invention is in the provision of a novel polarity reversible type rectifying circuit whereby the polarity of an output voltage may be reversed without switching transients or surging electric currents.

Another object of the invention is to provide a rectifying circuit of a polarity reversible type including switching means for effecting a reversal of the polarity of an output voltage together with a capacitor so arranged in operative relation therewith as to prevent surging transients from arising upon such polarity reversal.

These and other objects and features of the invention are pointed out in the following description in terms of the embodiments thereof which are shown in the accompanying drawings. It is to be understood, however, that the drawings are for the purpose of illustration only and are not a definition of the limits of the invention, reference being had to the appended claims for this purpose.

Figure 4:
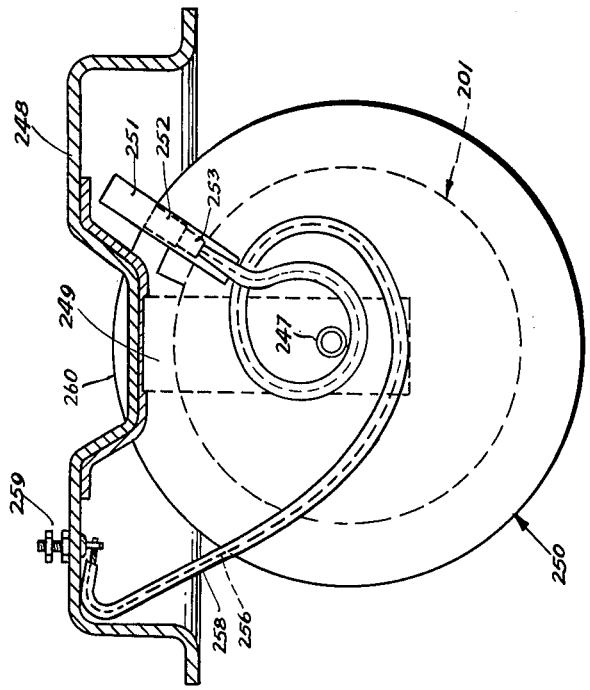
FIGURE 4 is a side view of one of the single brush assemblies of FIGURE 3.
Figure 5:
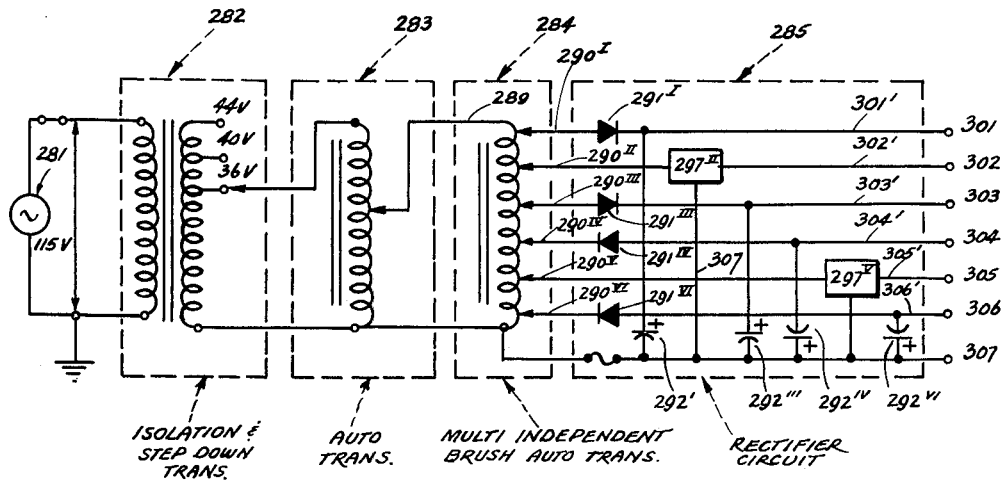
FIGURE 5 is a schematic drawing of a novel direct current power supply circuit incorporating a multi variable brush auto transformer such as shown in FIGURES 1 and 3.
Figure 6:
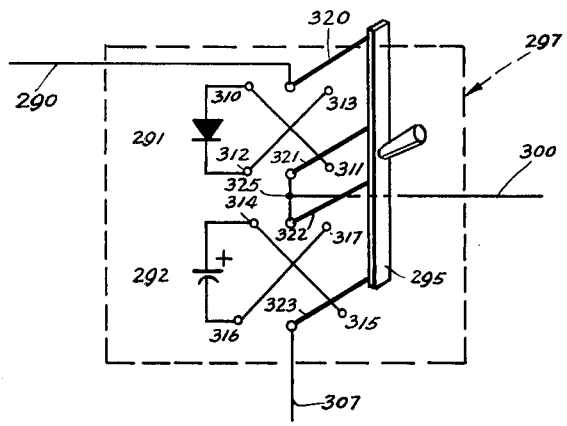
FIGURE 6 is a schematic drawing showing in detail a polarity reversal switch in the power supply circuit of FIGURE 5.

A novel direct current power supply is shown in the schematic drawings of FIGURES 5 and 6 and incorporates a novel multi independent brush auto transformer (or alternating current power supply, two embodiments of which are shown in FIGURES 1, 2, 3 and 4.

Figure 1:
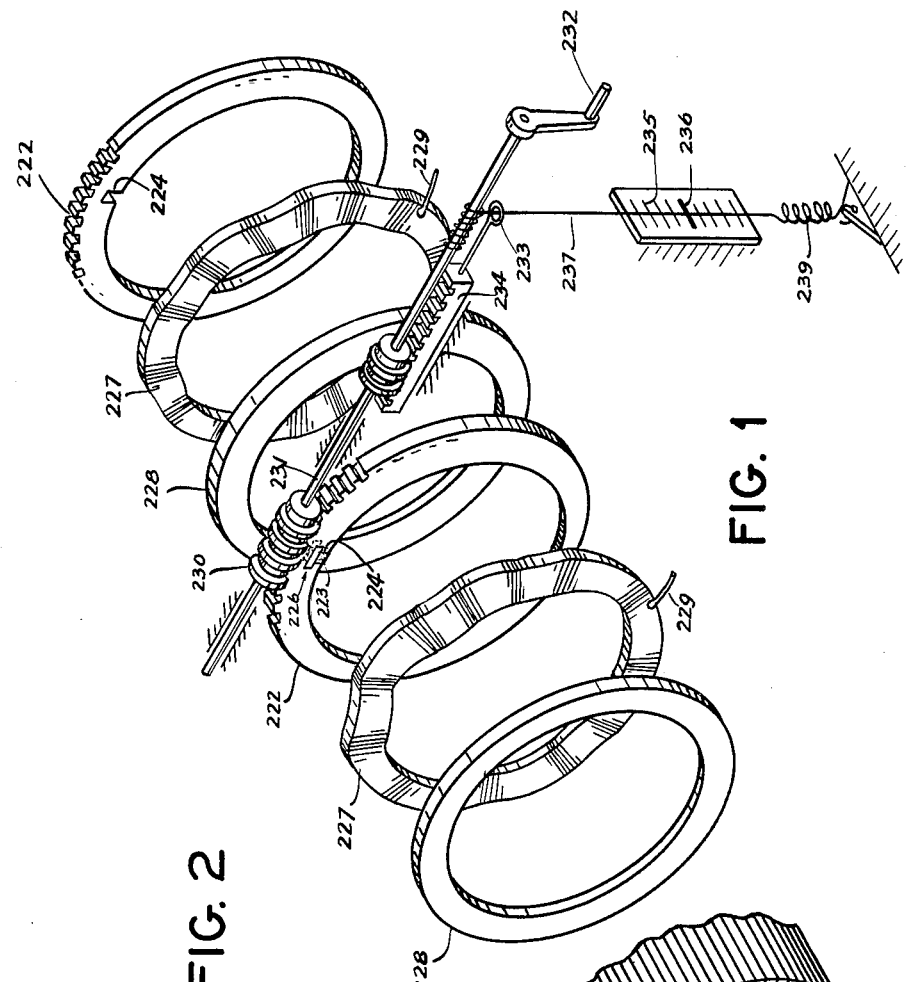
FIGURE 1 is an exploded view of the operative parts of a multi variable brush auto transformer of the present invention.

Referring to FIGURE 1, there is shown therein an exploded view of the operative parts of the novel multi independent brush auto transformer. In particular, a toroid 201 is wound with a wire 202 in a single layer over its outside cylindrical surface so as to provide an exposed segmental wire contact or commutator surface 203 of a wire wound toroid, as described and claimed in a copending U.S. application Serial No. 315,735, filed September 25, 1963, by Carroll B. Vaughan as a division of U.S. application Serial No. 166,343, filed January 15, 1962 by Carroll Byrd Vaughan, now U.S. Patent No. 3,213,520 granted October 26, 1965, to Carroll B. Vaughan for method for preparing a toroid core, and assigned to The Bendix Corporation, assignee of the present application. In the FIGURE 1, the wire is shown covering approximately 330° of the outside surface.

Two ends 218, 219, of the wire 202 to be connected to an alternating current source are brought out to two terminals 220 and 221 on a toroid frame (not shown). A ring gear 222 (having an inside diameter of, for example, approximately 3¼ inches, and an outside diameter of, for example, approximately 4½ inches with 10 teeth per inch on its outer diameter), fits over the toroid 201. The toroid 201 has an outside diameter of, for example, approximately 3 inches.

Figure 2:
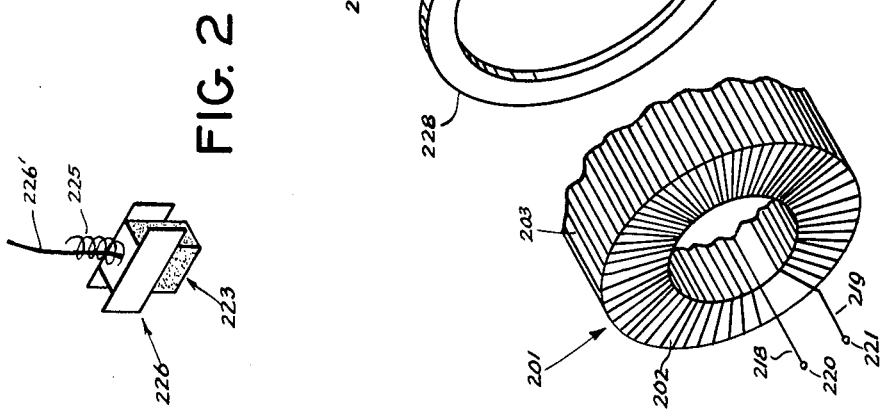
FIGURE 2 is a detailed view of a spring loaded brush and brush holder of the multi variable brush auto transformer shown in FIGURE 1.

A brush 223, held by a brush holder 226, makes a variable operative electrical contact with commutator surface 203 and is mounted in a slot 224 located in the wall of the gear 222 and is capable of moving radially in the gear under the constraint of the slot 224, spring loading means 225, and the brush holder 226. A detailed view of the spring loading 225, brush 223, and brush holder 226 is shown in FIGURE 2. The brush 223 is, for example, approximately $5/16$ by $1/16$ by $5/16$ of an inch, and the ring gear 222 has a width, for example, of $1/16$ of an inch. A flexible metal pigtail conductor 226' leads from the brush holder 226 to the metal ring gear 222. Thus, there is a conducting path from the input wire terminals 220 and 221, of the toroid 201 through the toroid windings 202 and commutator surface 203 to the brush 223, brush holder 226, and pigtail conductor 226' into the ring gear 222.

Ring gear 222 rides next to a wrinkle spring washer 227 made of a conducting material. A pigtail conductor 229 is soldered to the wrinkle washer 227 and brought out to a terminal lug (not shown) on the frame (not shown). An insulating ring washer 228 having the same dimension as the ring gear 222 is then stacked next to the wrinkle spring washer 227.

What has been just described, namely the ring gear 222, brush 223, wrinkle washer 227, and insulating ring 228 comprise one of many assemblies which are to be mounted in the multi independent brush auto transformer. In the present embodiment, 10 such assemblies are installed around the center toroid 201. It should be noted that the multiple brush auto transformer may comprise any number of outputs, depending on the length of the toroid 201 and the number of assemblies.

The toroid 201 is securely mounted on a rigid frame (not shown) and surrounded by a housing (not shown). The wire 202 on the toroid 201 is connected at its ends 218 and 219 to two terminals 220 and 221 mounted on the outside of the frame and housing.

The brushes 223 are positioned by rotation of the ring gear 222. This gear 222 is rotated by means of a worm gear 230 mounted on a shaft 231 terminating in a crank 232. By revolving the crank 232, the worm gear 230 causes the ring gear 222 to rotate.

The location of the brush 223 on the toroid commutator surface 203 is proportional to the number of revolutions of the crank 232 and is indicated on a flat slide rule indicator 235. A string 237 winds and unwinds with the direction of rotation of the crank 232. The string is lead over a small pulley and actuates pointer 236 on the slide rule indicator 235. A spring 239 or other restoring force returns the pointer 236 to the zero position when the brush is at a minimum position. As the crank 232 is turned, a rack and pinion arrangement advances a slotted shaft 234 with an eyelet 233 to guide the string 237, in order that the string will not slack up on the crank shaft 232, but will lay in even turns. There may be a plurality of such gear and brush assembly, and there is one indicating device for each gear and brush assembly and each slide rule indicator 235 may be calibrated in either percentages or proportional to the output voltage.

Alternative embodiment

Figure 3:
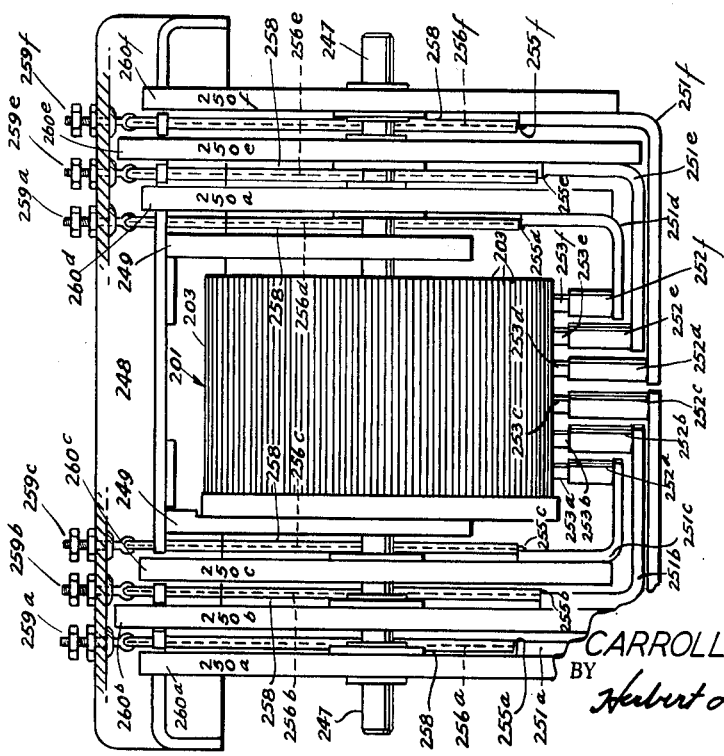
FIGURE 3 is a front view of the multi variable brush auto transformer.

FIGURE 3 shows a front view of an alternative embodiment of the multi independent brush auto transformer. FIGURE 4 shows a side view of a typical assembly of the transformer of FIGURE 3. The toroid 201 is rigidly mounted on a shaft 247 which is mounted on a frame 248 by two brackets 249. Six adjustors comprising six knurled wheels 250a through 250f are rotatably mounted on the shaft 247 and coaxial with the toroid 201. Six arms, 251a through 251f of conducting material are securely mounted on each to the knurled wheels 250a through 250f, and are so spaced that the arms can pass each other freely. Six brush holder assemblies 252a through 252f are mounted at the ends of arms 251a through 251f and each contains a brush 253a through 253f. Each brush 253a through 253f makes an operative electrical contact with a wire commutator surface 203 (or segmental surfaces of the wire winding) of the toroid 201, with each brush making contact along a different path or track on the wire wound commutator surface 203. The wire wound surface 203 may be, for example, of a commutator type.

Six electrical conductors 255a through 255f connect each conducting arm 251a through 251f to six hair springs 256a through 256f, made of conducting material. Each spring is made of, for example, phosphor bronze ribbon and is enclosed in a spaghetti sleeving 258, as shown in FIGURES 3 and 4. The enclosed springs 256a through 256f are coiled around the shaft 247 next to the associated wheel 250a through 250f to form a one and one quarter turn loop around the shaft when the brush 253 is rotated to, for example, a three hundred and thirty degree position; and a half open turn when the brush is in a zero degree position. The purpose of the phospher ribbon conductor is twofold: first, to mechanically standup under constant coiling and uncoiling, caused by the wheel 250 turning in adjustment of the output voltage; and second, to be a conductor from the brush 253 (in contact with the contact surface 203) to terminal 259 on the frame; that will not interfere with the independent motion of the wheels 250.

The other end of each spring ribbon 256a through 256f is connected to terminals 259a through 259f on the frame 248. Thus, a multi tap independently variable auto transformer is constructed. The number of independent variable taps will depend on the width of the toroid 201 and the number of knurled wheels 250 with attached arm 253 and brush 257.

Each of the knurled wheels 250a through 250f may bear suitable indicia 260a through 260f, respectively, to indicate the relative position of each brush 253 with respect to the wire wound commutator surface 203 and from, for example, the zero degree position to the three hundred and thirty degree position.

D.C. power supply circuit

Referring to FIGURE 5, there is shown therein a schematic drawing of a novel power supply circuit using the multi variable independent brush auto transformer of, for example, the type shown in FIGURES 1 and 2 or FIGURES 3 and 4. Referring to FIGURE 5, and tracing the structure and operation of the power supply simultaneously, an electrical potential 281 which may be the 115 volt A.C. commonly available, is applied across the input of an isolation and step down transformer 282 which reduces the line voltage to, for example, 36 volts. This output is fed to a conventional auto transformer 283 which in turn feeds current into a multi variable tap auto transformer 284 shown as including a winding 289 and six variable output terminals $290^I$ through $290^{VI}$. The adjustable output terminals $290^I$ through $290^{VI}$ are connected into a rectifier circuit 285, which rectifies the output of the auto transformer 284 to produce six adjustable D.C. voltages available at terminals 301 through 307. In particular, there is available adjustable positive direct voltages, for example, of 0 to +50 volts D.C. on taps 301 and 303; and direct negative voltage, for example, of 0 to −50 volts D.C. on taps 304 and 306; and continuously positive and negative adjustable voltages, for example, of −50 to +50 D.C. volts on taps 302 and 305. The amplitude control for each of the voltages available on taps 301 to 306 is the adjuster on the multi variable auto transformer (the crank handle 232 of FIGURE 1 or knurled wheel 250 of FIGURES 3 and 4).

The output at the first terminal $290^I$ of the multi variable tap transformer 284 is fed into a forward biased diode $291^I$ and then across an electrolytic capacitor $292^I$ whose negative side is connected to common. An output terminal 301 of the power supply is connected by a conductor 301' to the juncture of the diode $291^I$ and the electrolytic capacitor $292^I$. Thus, an A.C. voltage from the multi tap auto transformer is adjusted in amplitude by the multi tap auto transformer 284 and then rectified in the rectifier circuit 285.

The voltage at terminal 303 is rectified by a circuit identical to the one just described; and the voltage at taps 304 and 306 are rectified by the same circuit with the exception that diodes $291^{IV}$ and $291^{VI}$ and the capacitors $292^{IV}$ and $292^{VI}$ are of reversed polarity.

In order to supply continuously variable ±50 volt D.C. voltage on taps 302 and 305, a switching circuit $297^{II}$ and $297^V$ is applied comprising a four pole double throw switch 295, and shown in detail in FIGURE 6. The switch 295 includes four pairs of connected contacts 310 and 311, 312 and 313, 314 and 315, 316 and 317, and which pairs of contacts are arranged to cooperate respectively with four switch arms 320, 321, 322, and 323 of the four pole double throw switch 295. A diode 291 is connected in the forward direction across contacts 310 and 312 while a capacitor 292 is connected across contacts 314 and 316. An output voltage from the multi tap auto transformer 284 is applied through conductor 290 ($290^{II}$ or $290^{IV}$ of FIGURE 5) to the switch arm 320 of the switch 295; while the switch arms 321 and 322 are connected by a conductor 325 to an output conductor 300 (302' or 305' of FIGURE 5), and contact 323 is connected to common conductor 307. Thus, as shown in FIGURE 5, the terminals 302 and 305 are connected via conductors 302' and 305', respectively, to the switch arms 321 and 322 of the receiving switch 295 of FIGURE 6 included in the respective switching circuits $297^{II}$ and $297^V$ of FIGURE 5.

When the four pole double throw switch 295 is closed in one direction, current from the multi variable tap auto transformer 284 flows in the positive direction across diode 291 and is stored across capacitor 292. When the switch 295 is thrown in the opposite direction, the diode 291 is back biased and the capacitor 292 is reversed thus applying through conductors 325 and 300 (conductors 302' and 305' of FIGURE 5) a negative D.C. voltage to the output terminal 302 or 305. It should be noted that upon operation of this switch 295, there is an immediate reversal of polarity seen at the output terminal 302 or 305 and there is no surge transient, because the capacitor 292 does not discharge, and therefore does not have to be recharged. The diode 291 will effectively control and cause the charge on the capacitor 291 to remain in the same sense irrespective of the position of the reversing switch 295. Reversal of position of the switch 295 will, however, reverse the polarity seen at the output terminals 302 or 305.

Thus, the adjustable A.C. voltages available at terminal $290^{II}$ and $290^V$ from the multi tap transformer 284 are fed into the two circuits $297^{II}$ and $297^V$ which are similar to the circuit shown in FIGURE 6. The voltages are rectified and supplied through conductor 302' and 305' to terminals 302 and 305 as a continuously variable +50 to −50 D.C. voltage.

In addition to supplying a plurality of adjustable voltages, the power supply circuit supplies output voltages having a high resolution and great flexibility of range because the stepdown transformer 282 and the conventional auto transformer 283 can be adjusted, thereby the range output D.C. voltage available can be made large or small.

A further advantage of the D.C. power supply circuit as shown is that it avoids saturating the magnetic core of the multi independent brush auto transformer 284. Each rectifier circuit (diode 291 and capacitor 292), presents a half wave load to the multi tap auto transformer 284, however, some of the half wave loads (those on terminals $290^I$ and $290^{II}$ of the transformer 284) are of one polarity, while the loads on the terminals $290^{IV}$ and $290^{VI}$ are of a reversed polarity. Thus, saturation of the magnetic core of the transformer 284 may be avoided.

The power supply circuits of FIGURES 5, 6, 7 and 8 are described and claimed in the copending U.S. application Serial No. 166,224, filed January 15, 1962 by Carroll B. Vaughan and assigned to The Bendix Corporation, while the autotransformer of FIGURES 1, 2, 3 and 4 is described and claimed in a copending U.S. application Serial No. 300,312, filed August 6, 1963, by Carroll B. Vaughan as a division of the U.S. application Serial No. 166,224 and assigned to The Bendix Corporation.

While several embodiments of the invention have been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. In a rectifying circuit of a polarity reversible type for rectifying an alternating current comprising a four pole double throw switch including two outer rows and an inner row of contacts, of four contacts each, and a four blade switch alternately operable for connecting each contact of the inner row of contacts to the corresponding contact of one or the other of the outer row contacts; a rectifier connected between the first and second contact of one of the outer rows of contacts; a capacitor connected between the third and fourth contacts of said one outer row of contacts; a first conductor connected from the first contact of said one outer row to the second contact of the other outer row; a second conductor connected from the first contact of said other outer row to the second contact of said one outer row, a third conductor connected from the third contact of said one outer row to the fourth contact of said other outer row; a fourth conductor connected from the third contact of said other outer row to the fourth contact of said one outer row; a fifth conductor connected between the second and third contacts of said inner row, and a direct current output conductor for said rectifier leading from said fifth conductor; an alternating current input conductor for said rectifier leading to the first contact of the inner row of contacts; a conductor providing both an alternating current input to said rectifier and a direct current output from said rectifier leading to the fourth contact of the inner row of contacts, said rectifier upon an alternate operation of the switch from a position closing said one outer row of contacts to a position closing said other outer row of contacts during the application of an alternating current across said input conductors, there is effected across the direct current output conductors an immediate reversal of polarity without surging transient current and an operation in which the capacitor is retained in a continuous charged condition.

2. In a rectifying circuit of a polarity reversible type for rectifying an alternating current comprising an operator-operative switch means, a rectifier, and a capacitor, said capacitor and rectifier being serially connected in operative relation with said switch means, said switch means being selectively operable to reverse the series connection of said capacitor and rectifier in said operative relation with said switch means, a first conductor to said switch means providing a direct current output for said rectifier, a second conductor to said switch means providing an alternating current input for said rectifier, a third conductor to said switch means providing both an alternating current input to said rectifier and a direct current output from said rectifier, said rectifier upon the selective operation of said switch means during the application of an alternating current across said input conductors causing an immediate reversal of polarity in the direct current applied through said output conductors while the capacitor is retained in a continuous charged condition so as to prevent a transient surge in the direct current at the output conductors upon said reversal in the polarity thereof.

3. In a rectifying circuit of a polarity reversible type for rectifying an alternating current, said circuit including a rectifier having input and output conductors, a capacitor connected in series with said rectifier, and to a conductor common to the input and output of said rectifier, means for applying an alternating current to the input conductor of said rectifier so as to provide a direct current at the output conductor of said rectifier, and means for reversing the polarity of the direct current applied through the rectifier to the output conductors, and said reversing means including means for simultaneously reversing the series connection of the capacitor with said rectifier, and said capacitor being retained in a charged condition so as to prevent surging transient current upon a reversal in the polarity of said direct current at the output conductors.

References Cited by the Examiner

UNITED STATES PATENTS

| | | | |
|---|---|---|---|
| 2,129,783 | 9/1938 | Penney | 321—15 X |
| 2,637,010 | 4/1953 | Charske | 307—109 X |
| 3,048,766 | 8/1962 | Penzer | 321—8 X |
| 3,164,747 | 1/1965 | Yahnke | 317—8 X |

MILTON O. HIRSHFIELD, *Primary Examiner.*

LLOYD McCOLLUM, *Examiner.*